C. F. ECKART.
METHOD OF ENHANCING THE GROWTH OF PLANTS.
APPLICATION FILED MAR. 26, 1921.

1,377,566.

Patented May 10, 1921.

Inventor.
Charles F. Eckart.
By Chas. H. Weir
Atty.

UNITED STATES PATENT OFFICE.

CHARLES F. ECKART, OF HONOLULU, TERRITORY OF HAWAII.

METHOD OF ENHANCING THE GROWTH OF PLANTS.

1,377,566.   Specification of Letters Patent.   Patented May 10, 1921.

Continuation of application Serial No. 325,721, filed September 23, 1919. This application filed March 26, 1921. Serial No. 455,869.

*To all whom it may concern:*

Be it known that I, CHARLES F. ECKART, a citizen of the United States, residing in the city of Honolulu, Territory of Hawaii, have invented certain new and useful Improvements in Methods of Enhancing the Growth of Plants; and I do hereby declare the following to be a full, clear, and exact description of the invention, such as will enable others skilled in the art to which it appertains to make and use the same.

This application relates to a method of enhancing the growth of plants and is a continuation of my previous application, Ser. No. 325,721, filed September 23, 1919.

In agricultural practice a considerable amount of money and labor is expended, shortly after the planting operation, in the care-taking of young cultivated plants. It is the general practice to plant the seeds, bulbs, or other plant stock and, after the plants appear therefrom, to destroy the weeds by the use of a soil turning implement. Where plants are arranged in rows it is possible to use a horse-drawn implement to destroy the weeds between the rows, but it is necessary to destroy the weeds adjacent to the plants by the use of a hoe or similar implement. This latter operation must, of course, be carried out by hand and is, therefore, relatively expensive and requires considerable time. Furthermore, it is impossible to destroy the weeds adjacent to the plants without disturbing the plants themselves and this disturbance of the plant roots is reflected in the ultimate growth of the plants by a reduction in the output thereof. On the other hand, if the weeds are undisturbed they compete with the young plants and rob the latter of food and moisture so that the result is even more disastrous than where the roots of the plants are disturbed during the destruction of the weeds. The ideal condition is, of course, the one where the plants are permitted to attain their initial growth unhampered by the presence of weeds and to continue their growth still unhampered, and where the moisture of the soil and the fertilizer is preserved for the use of the plants.

The present invention aims to destroy or suppress the growth of weeds without necessitating the use of cultivators, hoes, or other soil disturbing implements; also to preserve the moisture and the fertilizer for the use of the plants, the former by preventing evaporation and the latter by preventing leaching. It also creates favorable temperature conditions in the soil by absorbing and transmitting solar heat to the soil.

In the following description I will illustrate my method as being applied to the treatment of plants which are arranged in rows, but it is to be understood that the practice of the method is not confined to the treatment of rows of plants, but is broadly to the treatment of plants irrespective of the manner in which they are planted, or their arrangement with relation to each other.

In the practice of the method, forming the subject matter of this invention, assuming that the plants are to be set in rows, the proposed lines of the rows are preferably watered, and, if desired, fertilizer is applied thereto. After the water, or the water and the fertilizer, are applied, the proposed lines of the rows have a suitable covering applied thereto in surface contact with the ground. This covering or mulch is made preferably of a paper or fabric impregnated, coated or otherwise treated with tar, asphalt, creosote, oil, wax, paraffin, paint, or a mixture of two or more of these substances, so that the mulch is rendered substantially water proof and opaque, and possesses, in a large degree, the capacity to absorb solar heat and distribute the stored heat, by radiation and convection, into the subjacent soil. This application of the mulch takes place before any of the plant seeds, bulbs, or other plant stock are set out.

In general practice it is preferable to allow an interval of time to elapse between the laying of the mulch and the setting out of the plant stock, which in some cases may be as much as four or five weeks or more, so that the weed seeds and bulbs in the covered soil will germinate and the resulting weeds be smothered and consequently destroyed. The soil condition which prevails beneath the coverings or mulches enhances or hastens the germination of the weed seeds or bulbs due to the presence of moisture and to the storing up of the solar heat by the opaque mulches described. It will be understood, of course, that in the practical application of this process, the interval between the laying of the mulch and the setting out of the plant stock will vary with the nature of the crop, the climatic conditions, the nature of the weeds, and the economic requirements with respect to the elimination or reduction of the particular weeds concerned; and in some cases no material interval of time need be allowed to elapse, since substantial advantages result from the use of my invention in the way of heat and moisture regulation as well as weed eradication, if the planting is done immediately after the mulch is laid on the ground.

Figure 1:
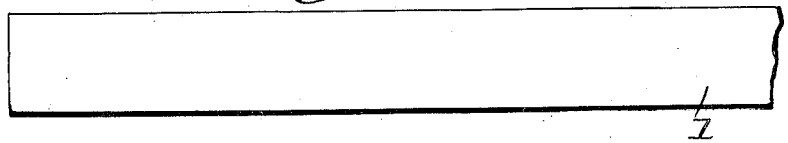
Figure 1 is a fragmental view illustrating the first step of the method.
Figure 2:
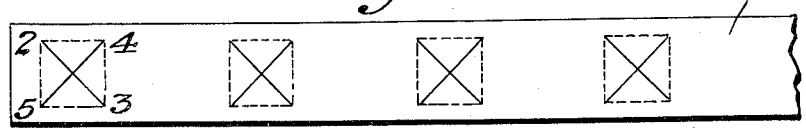
Fig. 2 is a fragmental view illustrating the second step of the method.
Figure 3:
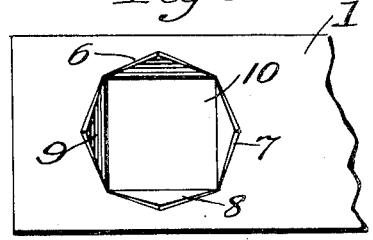
Fig. 3 is a fragmental view illustrating the third step of the method.
Figure 4:
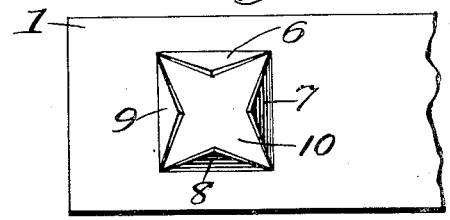
Figs. 4, 5, 6, 7, 8, 9 and 10 are fragmental views illustrating other manners in which the method may be carried out.

After the mulch has been applied, and, if desired, a sufficient period has elapsed to insure the growth and subsequent destruction of the weeds, or at least those which would otherwise require to be eradicated by conventional cultural methods, openings are produced in the mulches or coverings 1 at the planting centers. These openings may be produced by slitting the mulches under the cross intersecting lines 2—3 and 4—5 and by bending back the flaps 6, 7, 8 and 9, thus produced, in the manner illustrated in Figs. 2 and 3, the bending operation taking place along the dotted lines indicated in Fig. 2. The slitting of the mulches and the bending back of the flaps results in the exposure of a planting area 10. If the flaps are bent perpendicular to the plane of the mulch the maximum planting area will be exposed, but this area may be reduced as the conditions require by bending the flaps only partly to the perpendicular position, in which event they will occupy the positions illustrated in Fig. 4. It is perfectly obvious that when the flaps are bent into the position illustrated in Fig. 3, the planting area will be exposed to the sun and wind to a greater extent than where the flaps are bent into the position illustrated in Fig. 4. When the planting areas are thus exposed, the plant seeds, bulbs, or other plant stock are then set in the planting areas, the body of the mulch remaining in place. The resulting plants will thus grow unhampered by weeds and undisturbed by cultivating. The moisture which is retained in the soil by the mulches will enhance the growth of the plants and the fertilizer, if fertilizer be used, or the natural foods of the soil will be accessible to and preserved for the plants. As the flaps may lie almost prone or be bent into various positions they will permit the controlling of the growth of the plants to a nicety in that the evaporation of the moisture from the planting areas may be controlled, the access of the winds to the planting areas may be controlled, and, as the flaps are formed of heat absorbing material, the temperature of the planting area is maintained relatively even. Furthermore, the flaps will shed a considerable amount of rain and consequently will prevent the over-saturation of the soil in the planting areas.

By suitably adjusting the angular relation of the flaps to the body of the mulch any desirable degree of protection may be rendered the surface of the planting areas against the lodgment of extraneous weed seeds. In exceptionally weedy localities, or at such times when weeds in the vicinity are flowering and seeding, this consideration becomes one of the most important factors in determining the regulation of the flaps, which, for the maximum protection afforded, may be permitted to lie practically flat on the surface of the ground, except where the flexible extremities are slightly elevated by the growing plant.

Figure 5:
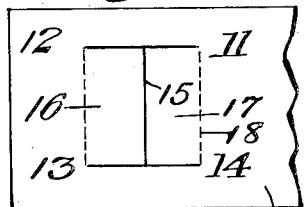
Figure 6:
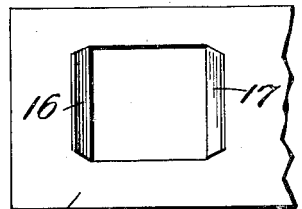
Figure 7:
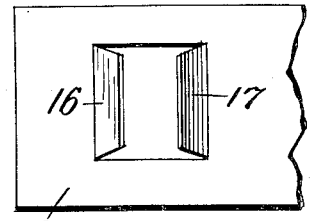
Figure 8:
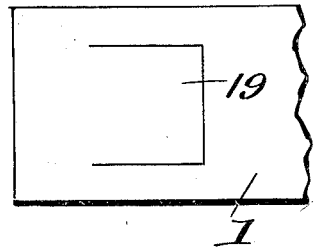
Figure 9:
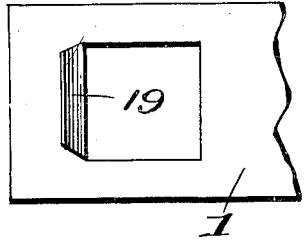
Figure 10:
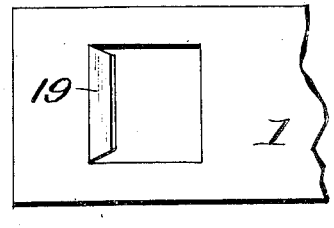

The mulches or coverings also function to produce and store nitrates. As has been previously stated, the mulches are preferably applied to the ground after the latter is watered or is wet by rain. This moisture of the soil in conjunction with the raised temperature of the soil, due to the nature of the covering, will stimulate the activities of the micro-organisms which are responsible for the production of nitrates. Owing to the superimposed coverings or mulches the nitrates so produced cannot be leached from the soil by the subsequent rains. The planting areas may be produced in various other manners than that already described, but for the purpose of illustration I have shown two additional methods, one being illustrated in Figs. 5, 6 and 7 and the other in Figs. 8, 9 and 10. The mulch 1 in the former series of figures is slit along the lines 11—12 and 13—14 and the slits thus produced are joined by an intersecting slit 15 which produces flaps 16 and 17. These flaps may be bent along the dotted lines 18 into the position illustrated in Fig. 6 where they expose the entire planting area, or they may be bent as illustrated in Fig. 7 where only a portion of the planting area is exposed. Then, again, the mulch may be slit along three sides of a rectangle to produce a flap 19 as illustrated in Fig. 8. This flap may be bent to expose the entire planting area or only part of the area as illustrated in Figs. 9 and 10.

While the formation and adjustment of the flaps in the manner shown in the drawings, is in many cases advantageous, it will be understood that this is not at all essential.

Irrespective of the form of the slits which are made in the mulches and the form of the planting area, the evaporation of the moisture, the access of the winds to the planting area, the shedding of the rains and the storing of the solar heat are advantageously controlled and the growth of the plants will be enhanced, and the weeds checked, suppressed or eradicated. Best results will, however, be obtained when slits are made in substantially the form indicated. From the nature and functions of the covering material good results will be obtained without leaving any appreciable interval of time between the laying of the mulch and the setting out of the plant stock. Optimum results, however, in general practice will follow a preliminary elimination of the weeds in accordance with the preferred method of applying the invention.

The terms "plant stock" and "plant producing stock," which I employ with reference to my invention, are used in the broadest sense and are intended to apply to all planting material of whatever kind or nature. Each of these terms applies, therefore, to seeds, bulbs, cuttings, slips, seedlings, small plants and any other plant substance which can sprout, develop or grow after it is set out or planted in the soil.

What I claim is:

1. The method of enhancing the growth of plants which comprises superimposing on the ground a flexible covering of opaque heat absorbing material adapted to distribute the absorbed heat to the soil, planting the plant producing stock through the covering, and maintaining the covering in place during the growth of the plants.

2. The method of enhancing the growth of plants which comprises superimposing on the ground a flexible covering of opaque heat absorbing material adapted to distribute the absorbed heat to the soil, forming openings in the covering, planting the plant producing stock in the areas exposed by said openings, and maintaining the covering in place during the growth of the plants.

3. The method of enhancing the growth of plants which comprises freeing from weeds the soil areas which are to receive the plant producing stock by means of a superimposed flexible covering of heat absorbing material, and planting said stock through the covering in the said weed freed areas.

4. The method of enhancing the growth of plants which comprises superimposing a flexible covering on the ground, slitting the covering to form a flap, bending the flap with relation to the covering to produce an exposed planting area, and planting the plant producing stock in said planting area.

5. The method of enhancing the growth of plants which comprises superimposing a covering on the ground, slitting the covering to form flaps, bending the flaps with relation to the covering to produce an exposed planting area and to afford a changeable protecting medium for the young plants, and planting the plant producing stock in said planting area.

6. The method of enhancing the growth of plants which comprises superimposing a covering on the ground until the weed seeds and bulbs are germinated and exterminated, slitting the covering to form flaps, bending the flaps with relation to the covering to produce an exposed planting area and to afford a changeable protecting medium for the young plants, and planting the plant producing stock in said planting area.

7. The method of enhancing the growth of plants which comprises superimposing on the ground a flexible covering of opaque impervious heat absorbing fabric, forming openings in said covering after the same has been laid, planting the plant producing stock through said openings, and maintaining the covering in place during the growth of the plants.

In testimony whereof I affix my signature.

CHARLES F. ECKART.